(12) United States Patent
Lee et al.

(10) Patent No.: US 9,074,745 B2
(45) Date of Patent: Jul. 7, 2015

(54) HEADLAMP FOR VEHICLE

(71) Applicant: HYUNDAI MOBIS CO., LTD., Seoul (KR)

(72) Inventors: Hyuk Min Lee, Yongin-si (KR); In Heum Park, Seongnam-si (KR); Hyun Soo Lee, Yongin-si (KR); Myung Gug Bang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 319 days.

(21) Appl. No.: 13/839,625

(22) Filed: Mar. 15, 2013

(65) Prior Publication Data

US 2014/0185307 A1 Jul. 3, 2014

(30) Foreign Application Priority Data

Dec. 27, 2012 (KR) .......................... 10-2012-0154031

(51) Int. Cl.
 *F21S 8/10* (2006.01)
(52) U.S. Cl.
 CPC ......... *F21S 48/1747* (2013.01); *F21S 48/1742* (2013.01)
(58) Field of Classification Search
 CPC ............. F21S 48/00; F21S 48/10; B60Q 1/04
 USPC .................................................. 362/459–549
 See application file for complete search history.

(56) References Cited

U.S. PATENT DOCUMENTS

| | | | |
|---|---|---|---|
| 8,664,859 B2* | 3/2014 | Kim et al. | 362/465 |
| 2009/0141513 A1* | 6/2009 | Kim | 362/507 |
| 2011/0121733 A1* | 5/2011 | Choi et al. | 315/82 |

FOREIGN PATENT DOCUMENTS

| | | | |
|---|---|---|---|
| JP | 2002-254980 A | 9/2002 |
| JP | 2005-285509 A | 10/2005 |
| JP | 2008-184013 A | 8/2008 |
| JP | 2009-021237 A | 1/2009 |
| JP | 2009-184642 A | 8/2009 |
| JP | 2009-218155 A | 9/2009 |
| JP | 2009-220631 A | 10/2009 |
| JP | 2009-220649 A | 10/2009 |
| JP | 2010-000957 A | 1/2010 |

OTHER PUBLICATIONS

Korean Office Action dated Dec. 19, 2013 of corresponding Korean Patent Application No. 10-2012-0154031—4 pages.

* cited by examiner

*Primary Examiner* — William Carter
(74) *Attorney, Agent, or Firm* — Knobbe Martens Olson & Bear, LLP (57) ABSTRACT

A headlamp for a vehicle, includes: a lower lamp module configured to form a first beam pattern at a front close range region of the vehicle while being fixed; and an upper lamp module including an ADB (adaptive drive beam) lamp module and a low beam lamp module, which are rotatably installed at an upper portion of the lower lamp module, respectively, and configured to form a variable second beam pattern which is combined with the first beam pattern. Therefore, stable driving visibility may be secured at a region close to a driver, various beam patterns may be implemented, light blindness to a driver of an oncoming vehicle may be prevented, and thereby forward recognition of the driver and the opposite driver may be improved.

20 Claims, 8 Drawing Sheets

HEADLAMP FOR VEHICLE

CROSS-REFERENCE TO RELATED APPLICATIONS

This application claims priority to and the benefit of Korean Patent Application No. 10-2012-0154031 filed in the Korean Intellectual Property Office on Dec. 27, 2012, the entire contents of which are incorporated herein by reference.

TECHNICAL FIELD

The present disclosure relates to a headlamp for a vehicle.

RELATED TECHNOLOGY

In general, lamps for a vehicle, includes a headlamp installed at a front side of the vehicle, and a tail lamp installed at a rear side of the vehicle. In general, the headlamps are lights that are mounted at both front sides of the vehicle and serve to secure a visual field of a driver in a driving direction during driving in night time. Further, an irradiation direction of a headlamp beam is differently set in accordance with a mode of right-hand traffic (left-hand drive) or left-hand traffic (right-hand drive).

In a left-hand-drive (LHD) vehicle, the headlamp is adjusted to irradiate a beam much farther toward a right side in a driving direction of the vehicle based on a centerline of a road, and in a right-hand-drive (RHD) vehicle, the headlamp is adjusted to irradiate a beam much farther toward a left side in the driving direction of the vehicle based on the centerline of the road. That is, the beam of the headlamp is adjusted to be irradiated at lower intensity on a region adjacent to the centerline. As the irradiation direction of the beam of the headlamp is adjusted like this, an amount of the beam that is irradiated to a driver driving in an opposite direction is reduced so that glaring light affecting the driver is prevented, and this has been adopted as a regulation.

Accordingly, research is being conducted on a method of securing a visual field of a driver by adjusting the light irradiation direction of the headlamp for a vehicle based on driving information of the vehicle, for example, information on a driving speed of the vehicle, a rotation angle of a wheel or the like. As a result of this effort, an adaptive front lighting system (AFLS) has been introduced to improve forward recognition of the driver and the opposite driver.

The headlamp to which the adaptive front lighting system (AFLS) is applied is configured to aim in up and down directions or in left and right directions according to a driving embodiment in order to allow the driver to secure optimum visibility. Particularly, in a case in which LEDs (light emitting diodes) are used as a light source of the headlamp, because the headlamp includes a plurality of LED modules, unlike a HID (High pressure Intensity discharge), the headlamp has a configuration in which a plurality of LED modules as a whole typically swivels when the headlamp swivels.

However, because the configuration of the headlamp in which the plurality of LED modules as a whole swivels changes a beam pattern at a region close to the driver (a front region about 500 m from the driver) and causes a change of close range illuminance, there is a problem in that a stable visual field is not secured at the region close to a driver. In addition, even a plurality of LED modules is provided corresponding to an irradiation region in order to prevent the aforementioned problem, but this causes a problem in that performance deteriorates in terms of resolution of light and costs for manufacturing the headlamp for a vehicle are increased.

In addition, in a case in which the headlamp swivels in the left and right directions for aiming in a predetermined direction, a space inside a housing is necessary according to the swivel motion. Here, the existing headlamp for a vehicle is configured to have a form in which a plurality of lamp modules is mounted at a base plate having a predetermined width, and this base plate is configured to rotate about a single rotating shaft.

In consideration of a width and a length of the base plate at which a plurality of lamp modules is mounted, a large space is necessary in the housing to receive the rotating base plate. In addition, there is also a problem in that an increase in costs and weight of the vehicle due to the installation of the base plate occurs.

Because the configuration in which the plurality of lamp modules rotates about the single rotating shaft causes a large radius of gyration of the lamp module, and an opened portion of the housing for the lamp becomes greater than an appropriate level, there is a problem in that matching of a design deteriorates.

In the existing headlamp for a vehicle, in which the base plate is installed, there is a problem in that it is difficult to mount the lamp module at the housing, and interference between the lamp module and other devices occurs.

Meanwhile, regarding the adaptive front lighting system using a shield, Korean Registered Patent No. 10-0761555 (registered on Sep. 18, 2007) 'Lamp shield driving apparatus providing multiple beam patterns and lamp assembly using the same' discloses an apparatus for forming various beam patterns (class C, class V, class E, class W and the like) by using a plurality of shields.

SUMMARY

An aspect of the present invention has been made in an effort to provide a headlamp for a vehicle, capable of securing stable driving visibility at a region close to a driver, implementing high resolution against an oncoming vehicle which approaches from a front side, that is, in an opposite lane, and implementing a high beam pattern without including an independent lamp module for implementing a high beam pattern.

Another aspect of the present invention is to provide a headlamp for a vehicle, which implements various beam patterns through a turn off control of a plurality of lamp modules.

Yet another aspect of the present invention is to provide a headlamp for a vehicle, which changes beam patterns in accordance with a driving condition of the vehicle, prevents light blindness to a driver of an oncoming vehicle, and thus improves forward recognition of the opposite driver.

Still another aspect of the present invention is to provide a headlamp for a vehicle, which reduces a size of a space inside a housing where the lamp modules are mounted, facilitates installations of the lamp modules, and may reduce a radius of gyration of the lamp modules to avoid interference with other devices.

An exemplary embodiment of the present invention, provides, a headlamp for a vehicle, including: a lower lamp module configured to form a first beam pattern at a front close range region of the vehicle while being fixed; and an upper lamp module including an ADB (adaptive drive beam) lamp module and a low beam lamp module, which are rotatably installed at an upper portion of the lower lamp module, respectively, and configured to form a variable second beam pattern which is combined with the first beam pattern, in which at least one of the patterns of a C class beam, an E class beam, a V class beam, and a high beam is implemented by turning on or turning off any one of the ADB (adaptive drive beam) lamp module and the low beam lamp module.

The headlamp may include a drive unit configured to rotate the ADB (adaptive drive beam) lamp module and the low beam lamp module in a horizontal direction, or to level the ADB (adaptive drive beam) lamp module and the low beam lamp module in a vertical direction.

The high beam pattern may be formed by turning on the ADB lamp module.

The ADB lamp module may include an L-shape pattern.

An amount of light of the high beam pattern may be increased by turning on the low beam lamp module.

The C class beam pattern may be formed by turning on the low beam lamp module.

The E class beam pattern may be formed by turning on the low beam lamp module and leveling the low beam lamp module.

The V class beam pattern may be formed by turning on the lower lamp module.

An amount of light and an irradiation range of the V class beam pattern may be complemented by turning on the low beam lamp module and leveling the low beam lamp module.

The headlamp for a vehicle, according to the exemplary embodiment of the present invention, may further include a link unit connected to the ADB (adaptive drive beam) lamp module and the low beam lamp module and configured to transmit a rotational force of the drive unit to rotate any one of the ADB (adaptive drive beam) lamp module and the low beam lamp module when the other rotates.

The ADB (adaptive drive beam) lamp module and the low beam lamp module may be disposed on the same horizontal plane to be spaced apart from each other.

The link unit may include a first link and a second link which are spaced apart from each other and disposed in a plurality of columns.

An imaginary extension line which connects each center of rotating shafts of the ADB (adaptive drive beam) lamp module and the first link and each center of rotating shafts of the ADB (adaptive drive beam) lamp module and the second link may be formed to be parallel to a longitudinal direction of the vehicle.

An imaginary extension line which connects each center of rotating shafts of the low beam lamp module and the first link and each center of rotating shafts of the low beam lamp module and the second link may be formed to be parallel to a longitudinal direction of the vehicle.

The lower lamp module may include a middle lamp module and a foreground lamp module.

The headlamp for a vehicle, according to the exemplary embodiment of the present invention, includes the lower lamp module which fixedly lights the front close range region of the vehicle, and the upper lamp module which swivels, and thus may secure stable driving visibility at a region close to a driver, and may implement various beam patterns.

The headlamp for a vehicle, according to the exemplary embodiment of the present invention, may increase resolution of the beam pattern corresponding to an oncoming vehicle by using the ADB (adaptive drive beam) lamp module including the L-Shape pattern which swivels, and may prevent light blindness to a driver of the oncoming vehicle and thereby improving forward recognition of the opposite driver.

The headlamp for a vehicle, according to the exemplary embodiment of the present invention, may implement various beam patterns without including an independent lamp module for implementing a high beam pattern. Therefore, as a result of a decrease in the number of components, weight and costs may be reduced.

The upper lamp module including a plurality of lamp modules is configured so that a plurality of lamp modules swivels about each rotating shaft along with the swivel motion of any one of the lamp modules, and thus provides an advantageous effect in that a radius of gyration of the entire upper lamp modules may be reduced.

The headlamp for a vehicle, according to the exemplary embodiment of the present invention, provides an advantageous effect in that a size of a space inside a housing where the lamp modules are mounted may be reduced, installations of the lamp modules may be facilitated, and thereby interference with other devices may be avoided. That is, the structure in which the ADB lamp module and the low beam lamp module swivel may improve matching of a design by optimizing an opened portion of the housing for the lamp, and may minimize interference with other devices.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION

Hereinafter, the exemplary embodiments of the present invention will be described in detail with reference to the accompanying drawings in order to clarify the solution to the technical objects of the present invention. However, to clearly describe the present invention, a description of the related art, which makes the subject matter of the present invention ambiguous, will be omitted. In addition, the terms described below are defined in consideration of each function in the present invention, and may be changed in accordance with the intention of a designer or a manufacturer or the practice. Therefore, the definition of the terms should be determined based on the contents disclosed in the entire specification. In addition, the elements denoted by the same reference numerals (drawing numbers) are the same elements throughout the specification.

Hereinafter, a headlamp 1 for a vehicle, according to an exemplary embodiment of the present invention, will be described.

Referring to FIGS. 1 to 6, a headlamp 1 for a vehicle, according to an exemplary embodiment of the present invention, includes a lower lamp module 100, an upper lamp module 200, and a housing 300. In addition, the upper lamp module 200 may include an ADB (adaptive drive beam) lamp module 210, and a low beam lamp module 220. Here, as light sources of the lower lamp module 100 and the upper lamp module 200, LEDs (light emitting diodes) may be used.

The lower lamp module 100 always lights a region close to a driver, that is, a front close range region of a vehicle with a uniform beam pattern, and serves to secure visibility for the front close range region. Hereinafter, a beam pattern of light that is irradiated from the lower lamp module 100 is referred to as a first beam pattern so as to be differentiated from a beam pattern of the upper lamp module 200, and a variable beam pattern that is irradiated by the upper lamp module 200 and combined with the first beam pattern is referred to as a second beam pattern.

Figure 1:
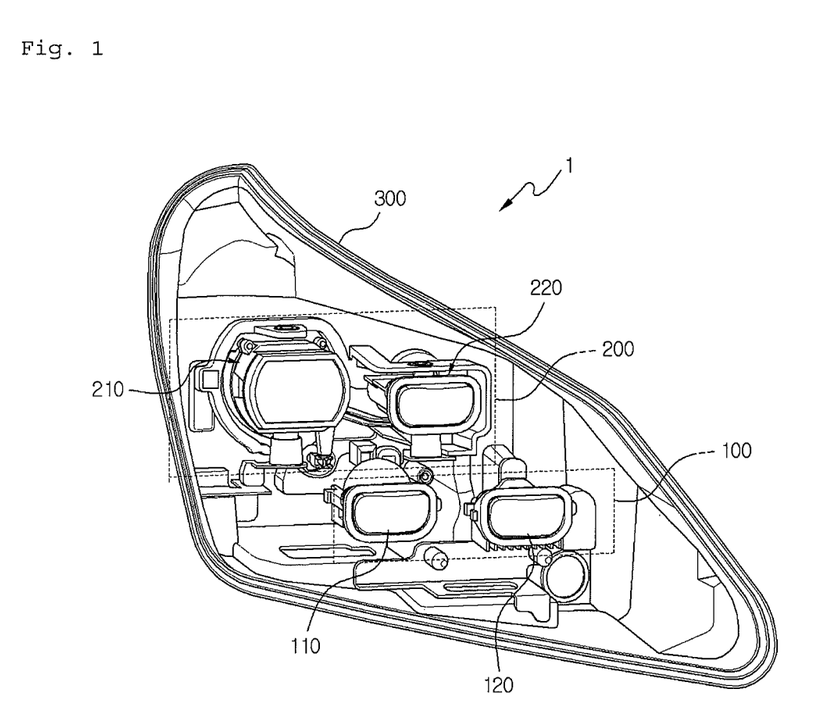
FIG. 1 is a view illustrating a headlamp for a vehicle, according to an exemplary embodiment of the present invention.

Referring to FIG. 1, the lower lamp module 100 is fixed and disposed at a lower portion of the housing 300. That is, the lower lamp module 100 is a fixed lamp module unlike the upper lamp module 200 that swivels. Therefore, the lower lamp module 100 secures stable visibility for the region close to the driver while uniformly maintaining illuminance on the front close range region of the vehicle. Here, the lower lamp module 100 may include at least one lamp module, and of course may include a plurality of lamp modules to secure an amount of light.

As illustrated in FIG. 1, the lower lamp module 100 may include a middle lamp module 110 and a foreground lamp module 120, and the middle lamp module 110 and the foreground lamp module 120 may be installed to be spaced apart from each other in a horizontal direction. According to this, the foreground lamp module 120, which is installed in front of the middle lamp module 110, secures illuminance on the front close range region in a wider range than the middle lamp module 110. Further, the beam pattern that is irradiated by the middle lamp module 110 and the beam pattern that is irradiated by the foreground lamp module 120 are overlapped with each other at a predetermined region, and thereby securing an amount of light so as to secure stable visibility for the region close to the driver.

Therefore, because the middle lamp module 110 and the foreground lamp module 120 are fixedly installed at the housing 300 to irradiate only uniform beam patterns to a front side of the vehicle, uniform illuminance on the front close range region of the vehicle is maintained regardless of the upper lamp module 200.

The upper lamp module 200 swivels to implement various beam patterns corresponding to a position of the oncoming vehicle. The upper lamp module 200 serves to form the variable second beam pattern that is combined with the first beam pattern which is formed by the aforementioned lower lamp module 100. This variable second beam pattern may be varied corresponding to the position of the oncoming vehicle.

Referring to FIG. 1, the upper lamp module 200 is installed at an upper side of the aforementioned lower lamp module 100, and coupled to the housing 300 so as to be able to swivel in the left and right directions.

Figure 2:
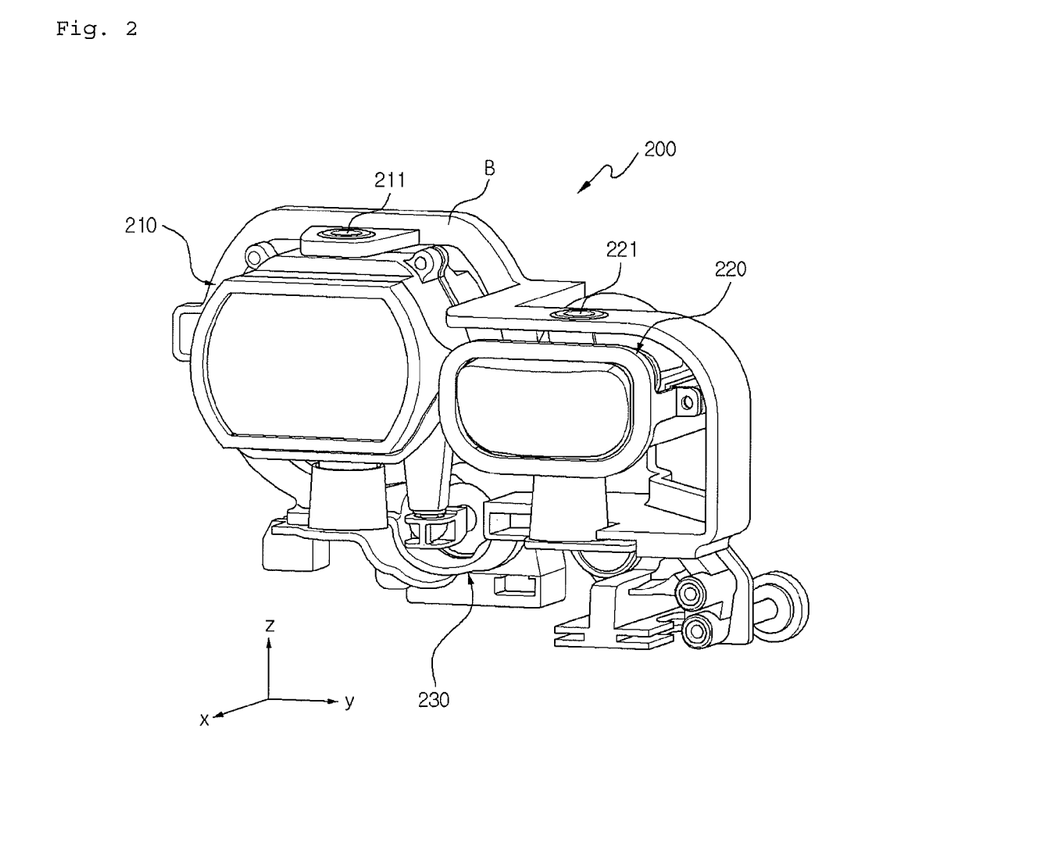
FIG. 2 is a view illustrating an upper lamp module of the headlamp for a vehicle, according to the exemplary embodiment of the present invention.

Referring to FIGS. 2 to 5, the upper lamp module 200 may include an ADB lamp module 210, a low beam lamp module 220, a drive unit 230, and a link unit 240, the ADB lamp module 210 and the low beam lamp module 220 are rotatably installed to be spaced apart from each other in the horizontal direction, respectively. That is, as illustrated in FIG. 2, the ADB lamp module 210 and the low beam lamp module 220 are installed at a mounting bracket B to be rotatable about swivel shafts 211 and 221, respectively.

The ADB lamp module 210 may further include an L-Shape pattern.

Here, the L-Shape pattern that is installed at the ADB lamp module 210 may be adjusted so that the driver in the oncoming vehicle that approaches in an opposite lane may not be blinded.

That is, the ADB lamp module 210 forms a dark zone to prevent the glaring by using the L-Shape pattern when the oncoming vehicle appears. Furthermore, the L-Shape pattern may form the dark zone that blocks only one region of light corresponding to only the oncoming vehicle among the light that is irradiated to the oncoming vehicle. In addition, when the position of the oncoming vehicle is changed according to the position of the oncoming vehicle, the ADB lamp module 210 follows the oncoming vehicle while swiveling, and thus makes forward recognition of the opposite driver improved.

Therefore, in the headlamp 1 for a vehicle, according to the exemplary embodiment of the present invention, a dark zone according to the position change of the oncoming vehicle may be implemented by using the swivel motion of the ADB lamp module 210, which will be described below, according to the position of the oncoming vehicle.

Referring to FIG. 2, the ADB lamp module 210 may be installed to be rotatable about a first swivel shaft 211, and the low beam lamp module 220 may be installed to be rotatable about a second swivel shaft 221. However, the present invention is not limited to this, and of course the ADB lamp module 210 and the low beam lamp module 220 may be configured to be rotatable about a single swivel shaft.

Any one of the ADB lamp module 210 and the low beam lamp module 220, which are installed on the same horizontal plane to be spaced apart from each other, may be disposed in front of the other.

The ADB lamp module 210 and the low beam lamp module 220 are disposed to be spaced apart from each other in the horizontal direction. Specifically, the ADB lamp module 210 and the low beam lamp module 220 may be installed side by side to be spaced apart from each other so that link rotating shafts 212 and 213 provided at the ADB lamp module 210 and link rotating shafts 222 and 223 provided at the low beam lamp module 220 are formed at the same height. These relative positions of the ADB lamp module 210 and the low beam lamp module 220 are only illustrative, and the present invention is not necessary to be limited to this.

Meanwhile, any one of the ADB lamp module 210 and the low beam lamp module 220 is positioned in front of the other based on an irradiation direction. Therefore, as illustrated in FIG. 3, the link unit 240 may be formed to be bent toward the irradiation direction.

Meanwhile, the headlamp 1 for a vehicle, according to the exemplary embodiment of the present invention, may further include a drive unit 230 that rotates the upper lamp module 200.

The drive unit 230 provides a driving force to swivel the ADB lamp module 210. Referring to FIG. 3, the drive unit 230 may be a driving assembly including a linear motor 231 that pushes or pulls the ADB lamp module 210 at a point spaced apart from a center line CL1 that passes through the first swivel shaft 211 of the ADB lamp module 210 based on the irradiation direction.

Figure 3:
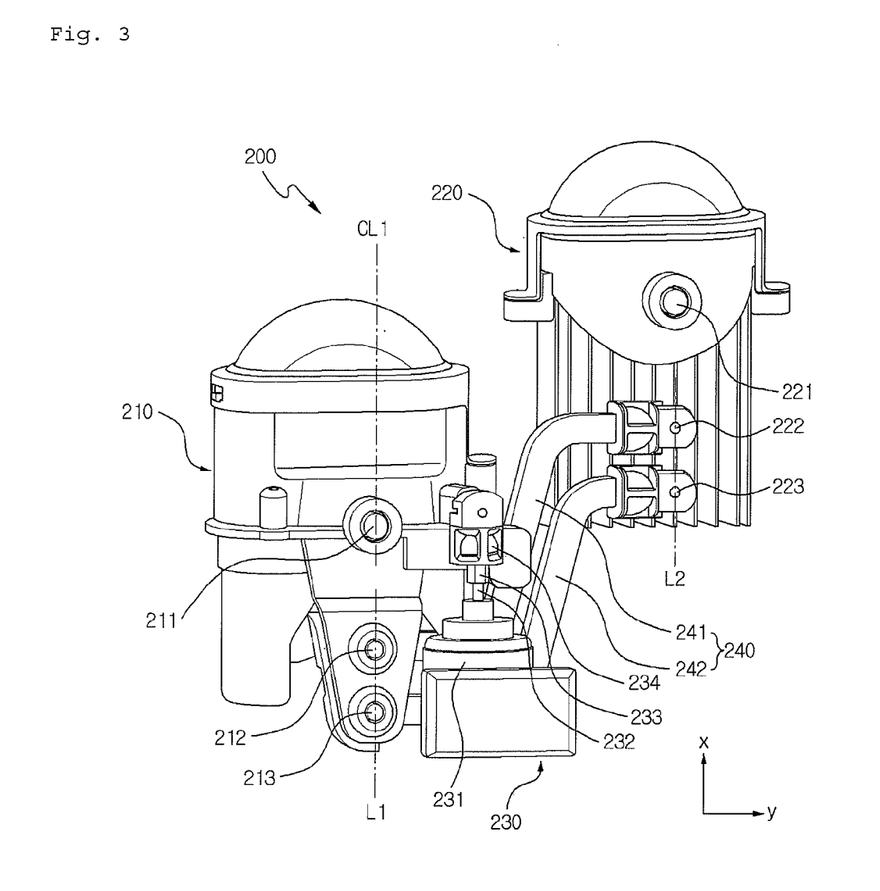
FIG. 3 is a bottom view illustrating a bottom side of the upper lamp module of the headlamp for a vehicle, according to the exemplary embodiment of the present invention.

Therefore, in the swiveling process, a moving shaft 232 is linearly moved by an operation of the linear motor 231 based on an x-axis direction of FIG. 3. Furthermore, as the moving shaft 232 is linearly moved, a connecting block 233 connected to the moving shaft 232 is also linearly moved.

Here, the connecting block 233 and the ADB lamp module 210 are connected to be operated together. Therefore, the ADB lamp module 210 swivels about the rotating shaft 211 along with the linear movement of the moving shaft 232. Meanwhile, the connecting block 233 and the moving shaft 232 are connected in a ball joint manner 234 to be able to more naturally convert the linear motion of the moving shaft 232 into the rotational motion of the ADB lamp module 210.

As illustrated in FIG. 3, the drive unit 230 may be positioned at a rear of the ADB lamp module 210. Of course, the present invention is not limited to the aforementioned configuration of the drive unit 230, and the drive unit 230 may be implemented so as to directly transmit a rotational force of the drive unit 230 to the rotating shaft 211 of the ADB lamp module 210.

As described above, while the description has been made with the drive unit 230 rotating the ADB lamp module 210, the drive unit 230 may be changed in design to rotate the low beam lamp module 220.

The link unit 240 serves to convert a rotational force according to the swivel motion of the ADB lamp module 210 into a linear motion force, and to transmit the linear motion force so that the low beam lamp module 220 may swivel.

Referring to FIG. 3, the link unit 240 includes a first link 241 and a second link 242 that are connected to the ADB lamp module 210 and the low beam lamp module 220.

The first link 241 and the second link 242 are rotatably installed at each lower portion of the ADB lamp module 210 and the low beam lamp module 220, respectively.

The first link 241 is connected to the ADB lamp module 210 via a 1-1 link rotating shaft 212. In the present exemplary embodiment, an axial direction of the 1-1 link rotating shaft 212 may be formed to be parallel to an axial direction of the rotating shaft 211 of the ADB lamp module 210. In addition the first link 241 is connected to the low beam lamp module 220 via a 1-2 link rotating shaft 222. An axial direction of the 1-2 link rotating shaft 222 may be formed to be parallel to an axial direction of the rotating shaft 221 of the low beam lamp module 220.

The second link 242 is connected to the ADB lamp module 210 via a 2-1 link rotating shaft 213. An axial direction of the 2-1 link rotating shaft 213 may be formed to be parallel to the axial direction of the rotating shaft 211 of the ADB lamp module 210. In addition, the second link 242 is connected to the low beam lamp module 220 via a 2-2 link rotating shaft 223. An axial direction of the 2-2 link rotating shaft 223 may be formed to be parallel to the axial direction of the rotating shaft 221 of the low beam lamp module 220.

Here, as illustrated in FIG. 3, the first link 241 and the second link 242 are spaced apart from each other and installed in a plurality of columns. That is, the first link 241 is positioned in front of the second link 242 based on the irradiation direction.

The use of the configuration in which the first link 241 and the second link 242 are arranged in a plurality of columns is to reduce mechanical tolerance when the rotational force of the ADB lamp module 210 is transmitted to the low beam lamp module 220.

Figure 4:
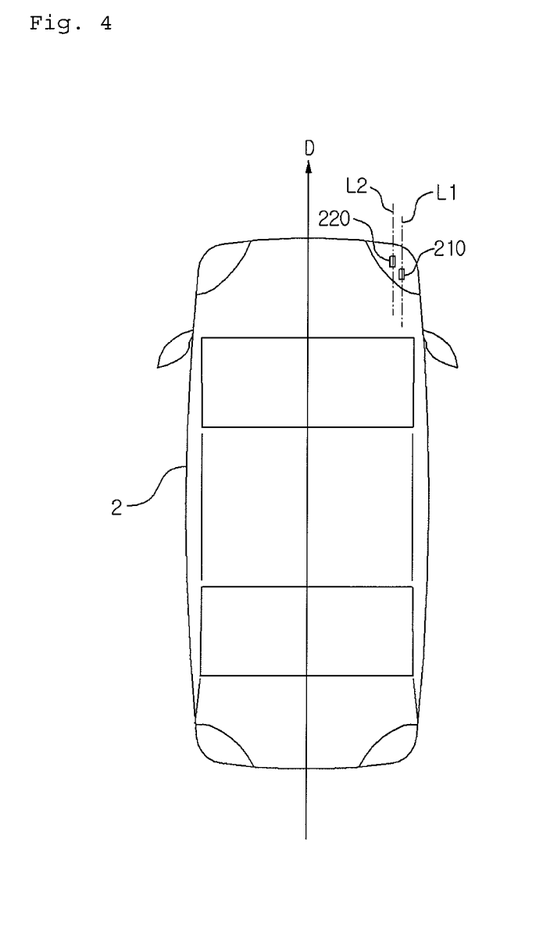
FIG. 4 is a view illustrating a state in which an imaginary extension line which connects rotating shafts of an ADB lamp module, a first link, and a second link, and an imaginary extension line which connects rotating shafts of a low beam lamp module, the first link, and the second link, are formed in a longitudinal direction of a vehicle.

FIG. 4 is a view illustrating a state in which an imaginary extension line which connects the rotating shafts of the ADB lamp module 210, the first link 241, and the second link 242, and an imaginary extension line which connects the rotating shafts of the low beam lamp module 220, the first link 241, and the second link 242, are formed in a longitudinal direction of the vehicle 2.

Referring to FIG. 4, the imaginary extension line L1 that connects a center of the link rotating shaft 212 of the ADB lamp module 210 and the first link 241 and a center of the link rotating shaft 213 of the ADB lamp module 210 and the second link 242 may be formed to be parallel to the longitudinal direction of the vehicle 2, that is, a direction indicated by an arrow D illustrated in FIG. 4.

The imaginary extension line L2 that connects a center of the link rotating shaft 222 of the low beam lamp module 220 and the first link 241 and a center of the link rotating shaft 223 of the low beam lamp module 220 and the second link 242 may be formed to be parallel to the longitudinal direction of the vehicle 2.

That is, the use of the configuration in which the longitudinal direction of the vehicle 2 and the imaginary extension lines L1 and L2 are formed to be parallel to each other is to prevent a range of the swivel motions of the ADB lamp module 210 and the low beam lamp module 220 from being small based on a driving direction.

Meanwhile, in the link unit 240, because the low beam lamp module 220 is disposed in front of the ADB lamp module 210 based on the irradiation direction, the first link 241 and the second link 242, which starts with the ADB lamp module 210 and heads for the low beam lamp module 220, are formed to be bent in the irradiation direction.

Figure 5:
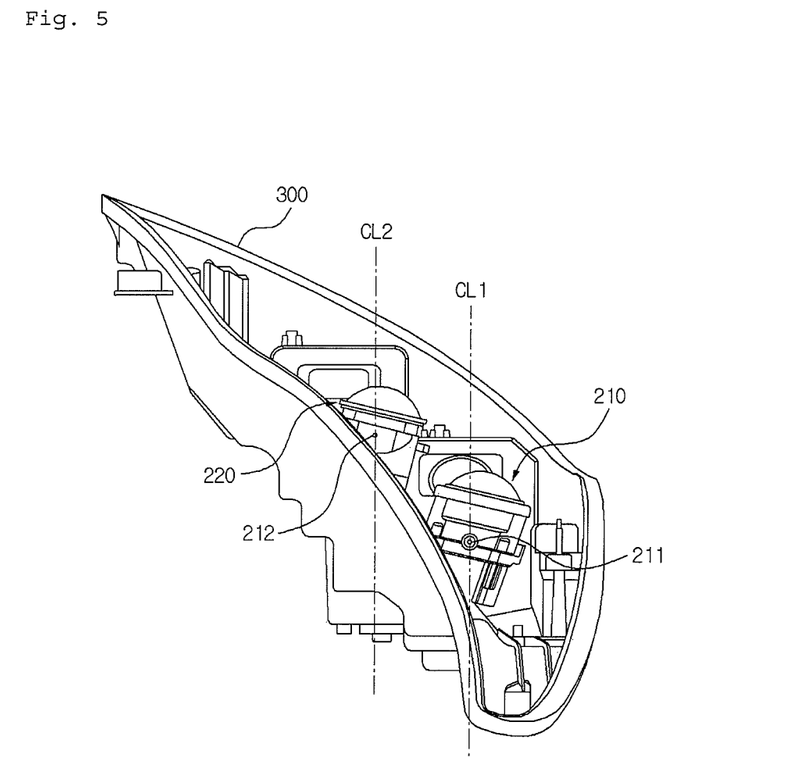
FIG. 5 is a view illustrating an operational state in which the upper lamp module swivels.

FIG. 5 is a view illustrating an operational state in which the upper lamp module 200 swivels.

Referring to FIG. 5, assuming that centerlines that pass through the rotating shafts 211 and 212 of the ADB lamp module 210 and the low beam lamp module 220 in the irradiation direction are referred to as CL1 and CL2, respectively, it may be confirmed that the ADB lamp module 210 and the low beam lamp module 220 swivel to the right based on CL1 and CL2 illustrated in FIG. 5. Here, because the ADB lamp module 210 and the low beam lamp module 220 swivel about each rotating shaft 211 and 212, a space needed for rotation in the housing 300 is smaller than that in a case in which the lamp modules are mounted on a base plate and swivel about a single rotating shaft.

Therefore, the swivel structure of the ADB lamp module 210 and the low beam lamp module 220 of the headlamp 1 for a vehicle, according to the exemplary embodiment of the present invention, may improve matching of a design by optimizing an opened portion inside the housing 300. In addition, the ADB lamp module 210 and the low beam lamp module 220 may be easily mounted in the housing 300 and interference with other devices may be minimized.

Figure 6:
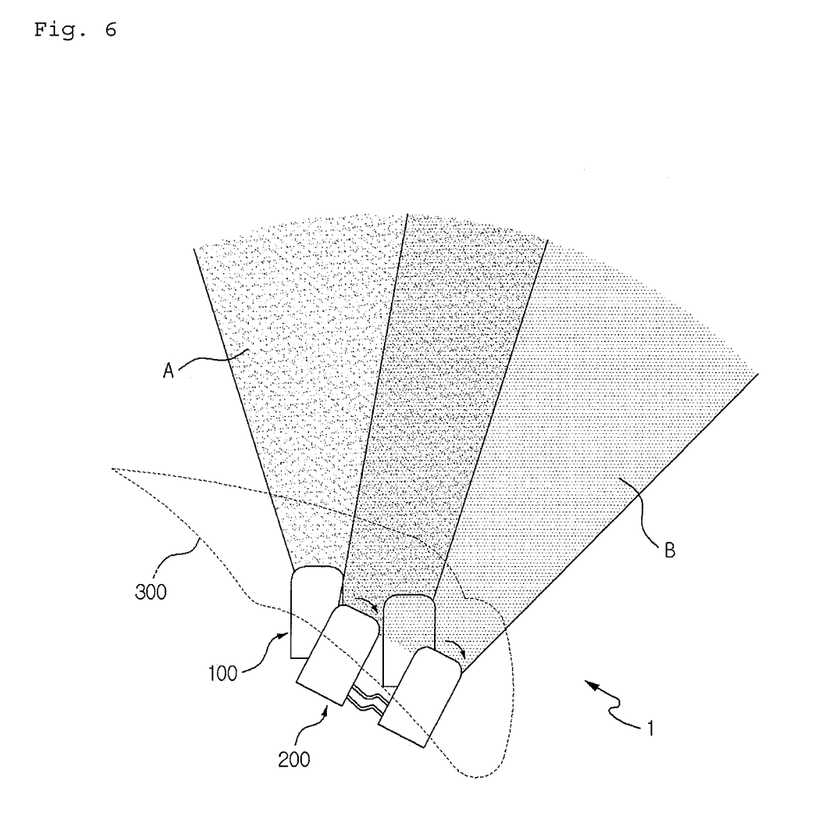
FIG. 6 is a view illustrating a relationship between beam patterns according to the upper lamp module and a lower lamp module at a rear side.

FIG. 6 is a view illustrating beam patterns according to the upper lamp module 200 and the lower lamp module 100, respectively, at a rear side.

Referring to FIG. 6, a first beam pattern A formed by the lower lamp module 100 is not moved and fixed to be irradiated to the front close range region. Therefore, the first beam pattern A always lights the front close range region of the vehicle. In addition, a second beam pattern B formed by the upper lamp module 200 swivels in left and right directions according to the position of the oncoming vehicle.

As such, the headlamp 1 for a vehicle, according to the exemplary embodiment of the present invention, may form the beam pattern that changes a beam pattern to a beam pattern that secures visibility for the front close range region of the driver and corresponds to the position of the oncoming vehicle by securing stable visibility at the region close to the driver through the fixed first beam pattern A and changing the beam pattern corresponding to the position of the oncoming vehicle by 0.05° interval through the variable second beam pattern B when the oncoming vehicle approaches.

The drive unit 230 of the headlamp 1 for a vehicle, according to the exemplary embodiment of the present invention, may further include a leveling drive device (not illustrated) that performs a leveling process in which a height of a light axis of the upper lamp module 200 is adjusted.

The leveling drive device is installed to connect an independent gear device (not illustrated) such as a rack, a pinion or the like to the drive unit 230, and thus performs the leveling of the upper lamp module 200 by using power of the drive unit 230.

Without using power of the drive unit 230, an independent leveling drive device, which implements the leveling of the upper lamp module 200, may be installed to perform the leveling of the upper lamp module 200.

Hereinafter, a light turn-on control of the lamp modules that form various beam patterns (C class, E class, V class, and high beam pattern) by using the headlamp 1 for a vehicle, according to the exemplary embodiment of the present invention, will be described.

Figure 7:
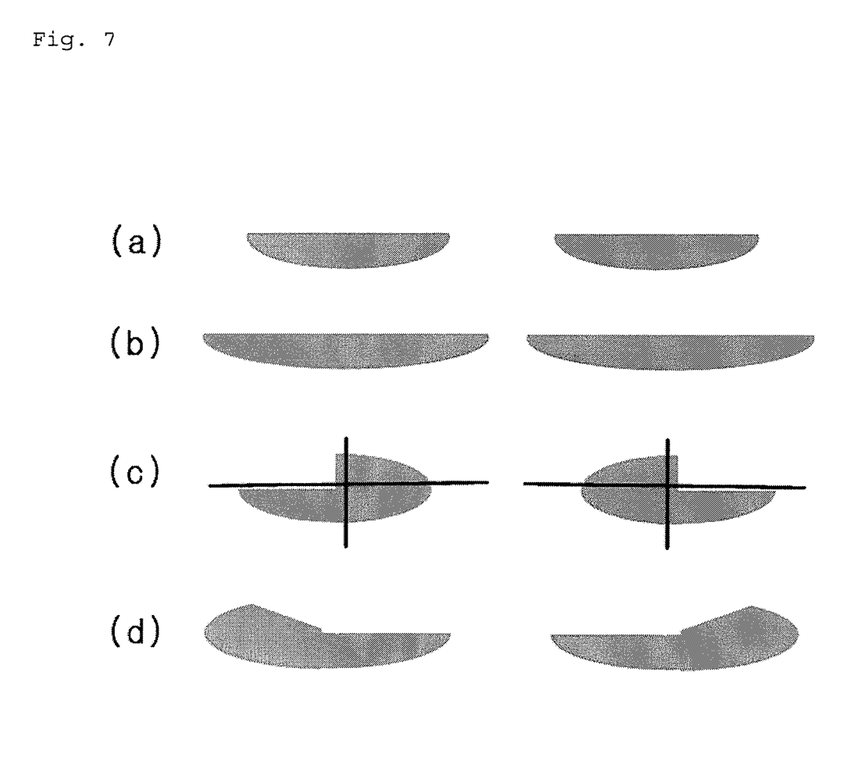
FIG. 7 is a view illustrating beam patterns which are formed by each module of the headlamp for a vehicle, according to the exemplary embodiment of the present invention.
Figure 8:
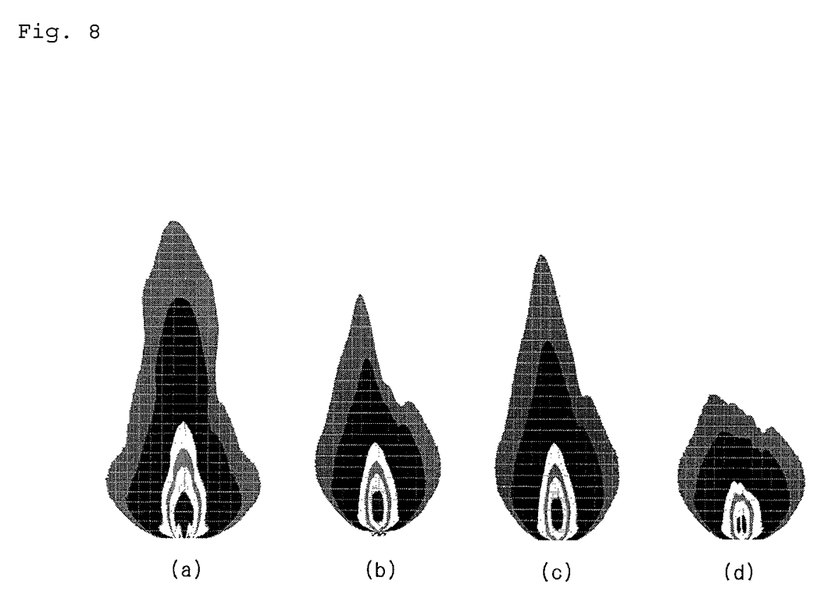
FIG. 8 is a view illustrating beam patterns formed by the headlamp for a vehicle, according to the exemplary embodiment of the present invention.

FIG. 7 is a view illustrating beam patterns which are formed by each module of the headlamp for a vehicle, according to the exemplary embodiment of the present invention. FIG. 8 is a view illustrating beam patterns formed by the headlamp for a vehicle, according to the exemplary embodiment of the present invention.

Here, the beam patterns illustrated in FIGS. 7A, 7B, 7C, and 7D are beam patterns irradiated by the middle lamp module 110, the foreground lamp module 120, the upper lamp module 200, the ADB (adaptive drive beam) lamp module 210, and the low beam lamp module 220, respectively. In addition, FIGS. 8A, 8B, 8C, and 8D illustrate patterns of a high beam, a C class beam, an E class beam, and a V class beam that are implemented by the headlamp 1 for a vehicle, according to the exemplary embodiment of the present invention.

Referring to FIGS. 1, 7, and 8, in the headlamp 1 for a vehicle, according to the exemplary embodiment of the present invention, as illustrated in FIG. 8A, the high beam pattern may be formed by turning on the ADB (adaptive drive beam) lamp modules 210 that are provided at both front sides of the vehicle 2, respectively. Furthermore, an amount of light may be increased by implementing the high beam pattern by turning on the middle lamp module 110, the foreground lamp module 120, and the low beam lamp module 220 apart from the turning on of the ADB (adaptive drive beam) lamp module 210. Particularly, the low beam lamp module 220 is turned on together with the turning on of the ADB (adaptive drive beam) lamp module 210, and thereby visibility of the driver may be easily secured.

A distance at which the high beam pattern is irradiated may be complemented through a leveling up process for the upper lamp module 200.

Of course, stable driving visibility may be secured at the region close to the vehicle 2 by turning on the middle lamp module 110 and the foreground lamp module 120 and fixedly lighting the front close range region of the vehicle 2.

Meanwhile, the headlamp 1 for a vehicle, according to the exemplary embodiment of the present invention, may implement the C class beam pattern, as illustrated in FIG. 8B, by turning on the low beam lamp module 220.

Here, the C class beam pattern is a beam pattern that is appropriate to be applied to the vehicle 2 driving at about 30-90 km/h like when driving on a country road, and the C class beam pattern is a pattern that secures a visual field to the opposite lane and increases an amount of light.

Of course, even in a case in which the C class beam pattern is implemented by turning on the low beam lamp module 220, stable driving visibility may be secured at the region close to the vehicle 2 by turning on the middle lamp module 110 and the foreground lamp module 120 and fixedly lighting the front close range region of the vehicle 2.

The headlamp 1 for a vehicle, according to the exemplary embodiment of the present invention, may implement the E class beam pattern by turning on the low beam lamp module 220 and leveling the low beam lamp module 220, as illustrated in FIG. 8C.

Here, the E class beam pattern is a beam pattern that is appropriate to be applied to the vehicle 2 driving at equal to or more than about 90 km/h like when driving on a highway or on a road in which a straight course is maintained over a considerable distance, and has a characteristic that a front long distance visual field thereof is somewhat longer than that of the C class beam pattern.

Of course, even in a case in which the E class beam pattern is implemented by turning on the low beam lamp module 220, stable driving visibility may be secured at the region close to the vehicle 2 by turning on the middle lamp module 110 and the foreground lamp module 120 and fixedly lighting the front close range region of the vehicle 2.

Meanwhile, the V class beam pattern may be implemented by turning on the lower lamp module 100, as illustrated in FIG. 8D.

Here, the V class beam pattern is a beam pattern that is appropriate to be applied to the vehicle 2 driving in an environment where brightness of peripheral illumination is somewhat secured like in an urban district, that is, peripheral illuminance is equal to or greater than a predetermined level (12 Lx). Particularly, visual fields at left/right sides thereof are larger than those of the C class beam pattern, and a front visual field thereof is secured to be somewhat (approximately 50 to 60 m) shorter than that of the C class beam pattern.

When the V class beam pattern is implemented, the headlamp 1 for a vehicle, according to the exemplary embodiment of the present invention, may complement an amount of light of the V class beam pattern and an irradiation range of the headlamp 1 for a vehicle, according to the exemplary embodiment of the present invention, by turning on the low beam lamp module 220 and leveling down the low beam lamp module 220.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A headlamp for a vehicle, comprising: a housing;
    a lower lamp installed within the housing and module configured to form a first beam pattern at a front close range region of the vehicle; and
    an upper lamp module comprising an ADB (adaptive drive beam) lamp module and a low beam lamp module, that are installed within the housing over the lower lamp module, the upper lamp module configured to form a variable second beam pattern, wherein the lower lamp module is fixed relative to the housing while the ADB lamp module and the low beam lamp module are rotatable about an axis relative to the housing, wherein the headlamp is configured to generate a plurality of beam patterns that combine the first beam pattern and the variable second beam pattern,
    wherein the ADB (adaptive drive beam) lamp module and the low beam lamp module are configured to be turned on or off to form at least one selected from the group consisting of a C class beam pattern, an E class beam pattern, a V class beam pattern, and a high beam pattern.

2. The headlamp of claim 1, further comprising:
    a drive unit configured to rotate the ADB (adaptive drive beam) lamp module and the low beam lamp module in a horizontal direction, or to level the ADB (adaptive drive beam) lamp module and the low beam lamp module in a vertical direction.

3. The headlamp of claim 2, wherein the E class beam pattern is formed by turning on the low beam lamp module and leveling the low beam lamp module.

4. The headlamp of claim 2, further comprising:
    a link unit connected to the ADB (adaptive drive beam) lamp module and the low beam lamp module and configured to transmit a rotational force of the drive unit to rotate any one of the ADB (adaptive drive beam) lamp module and the low beam lamp module when the other rotates.

5. The headlamp of claim 4, wherein the ADB (adaptive drive beam) lamp module and the low beam lamp module are disposed on a horizontal plane and spaced apart from each other.

6. The headlamp of claim 4, wherein the link unit comprises a first link and a second link which are spaced apart from each other and disposed in a plurality of columns.

7. The headlamp of claim 6, wherein an imaginary extension line which connects each center of rotating shafts of the ADB (adaptive drive beam) lamp module and the first link and each center of rotating shafts of the ADB (adaptive drive beam) lamp module and the second link is formed to be parallel to a longitudinal direction of the vehicle.

8. The headlamp of claim 6, wherein an imaginary extension line which connects each center of rotating shafts of the low beam lamp module and the first link and each center of rotating shafts of the low beam lamp module and the second link is formed to be parallel to a longitudinal direction of the vehicle.

9. The headlamp of claim 1, wherein the high beam pattern is formed by turning on the ADB lamp module.

10. The headlamp of claim 9, wherein the ADB lamp module comprises an L-shape pattern.

11. The headlamp of claim 10, wherein an amount of light of the high beam pattern is increased by turning on the low beam lamp module.

12. The headlamp of claim 1, wherein the C class beam pattern is formed by turning on the low beam lamp module.

13. The headlamp of claim 1, wherein the V class beam pattern is formed by turning on the lower lamp module.

14. The headlamp of claim 13, wherein an amount of light and an irradiation range of the V class beam pattern are complemented by turning on the low beam lamp module and leveling the low beam lamp module.

15. The headlamp of claim 1, wherein the lower lamp module comprises a middle lamp module and a foreground lamp module.

16. A vehicle comprising the headlamp of claim 1.

17. The vehicle of claim 16, further comprising:
    a headlamp control configured to control the lower lamp module and the upper lamp module to generate the plurality of beam patterns that combine the first beam pattern and the variable second beam pattern.

18. The vehicle of claim 17, wherein the headlamp control is configured to selectively turn on and off one or more of the lower lamp module, the ADB lamp module and the low beam lamp module to form at least one selected from the group consisting of a C class beam pattern, an E class beam pattern, a V class beam pattern, and a high beam pattern.

19. The vehicle of claim 18, wherein the headlamp control is configured to selectively level one or more of the ADB lamp module and the low beam lamp module to form at least one selected from the group consisting of a C class beam pattern, an E class beam pattern, a V class beam pattern, and a high beam pattern.

20. The vehicle of claim 19, wherein the headlamp control is configured to turn on the ADB lamp module for the high beam pattern, wherein the headlamp control is configured to turn on the low beam lamp module for the C class beam pattern, wherein the headlamp control is configured to turn on the low beam lamp module and level the low beam lamp module for the E class beam pattern, wherein the headlamp control is configured to turn on the lower lamp module for the V class beam pattern.

* * * * *